Oct. 24, 1933.   H. B. HARTMAN   1,931,818
WATER PURIFYING APPARATUS
Filed Oct. 10, 1930   3 Sheets-Sheet 1
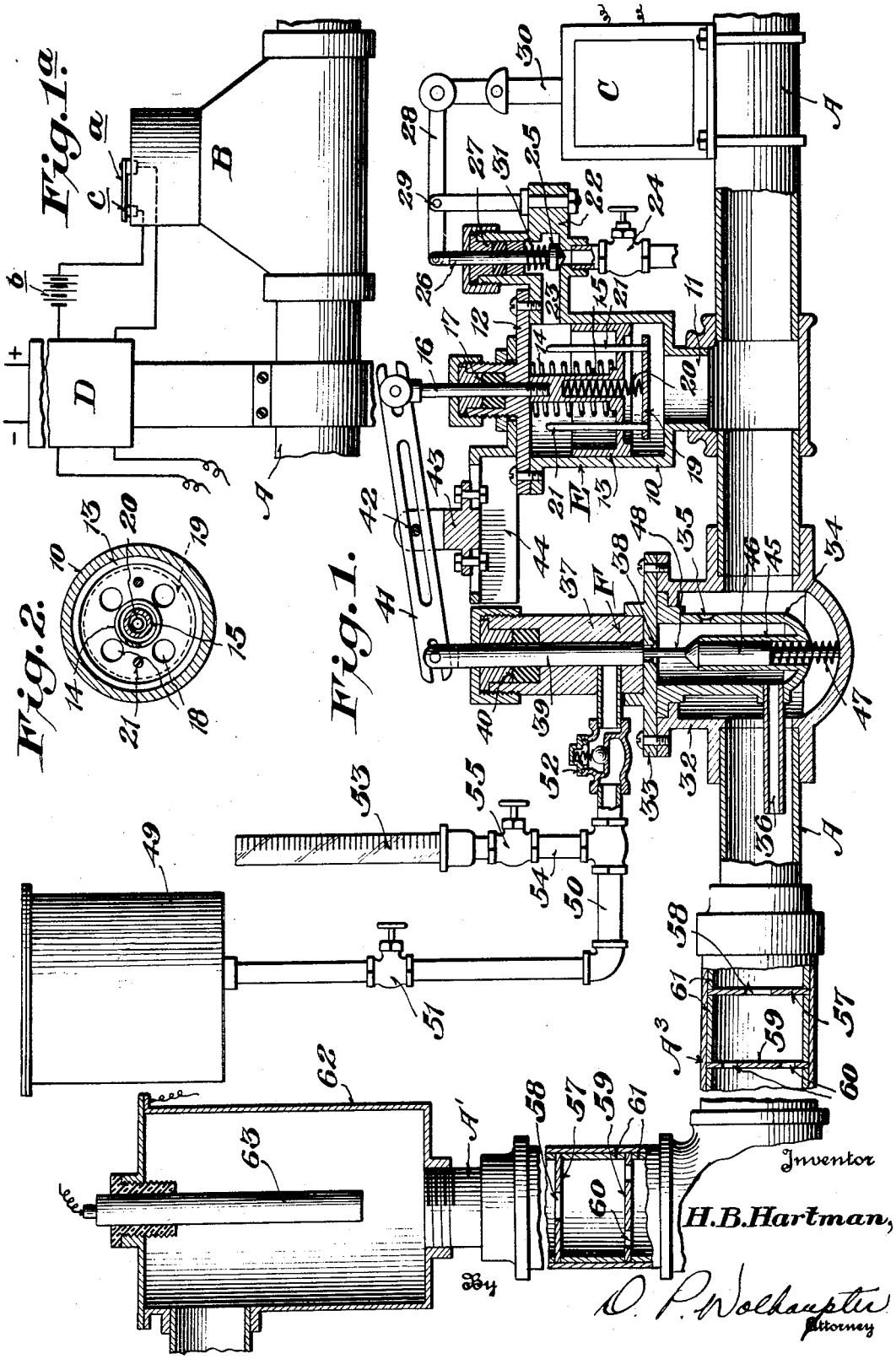
Inventor
H. B. Hartman,
By D. P. Wolhaupter
Attorney Oct. 24, 1933.  H. B. HARTMAN  1,931,818
WATER PURIFYING APPARATUS
Filed Oct. 10, 1930   3 Sheets-Sheet 2
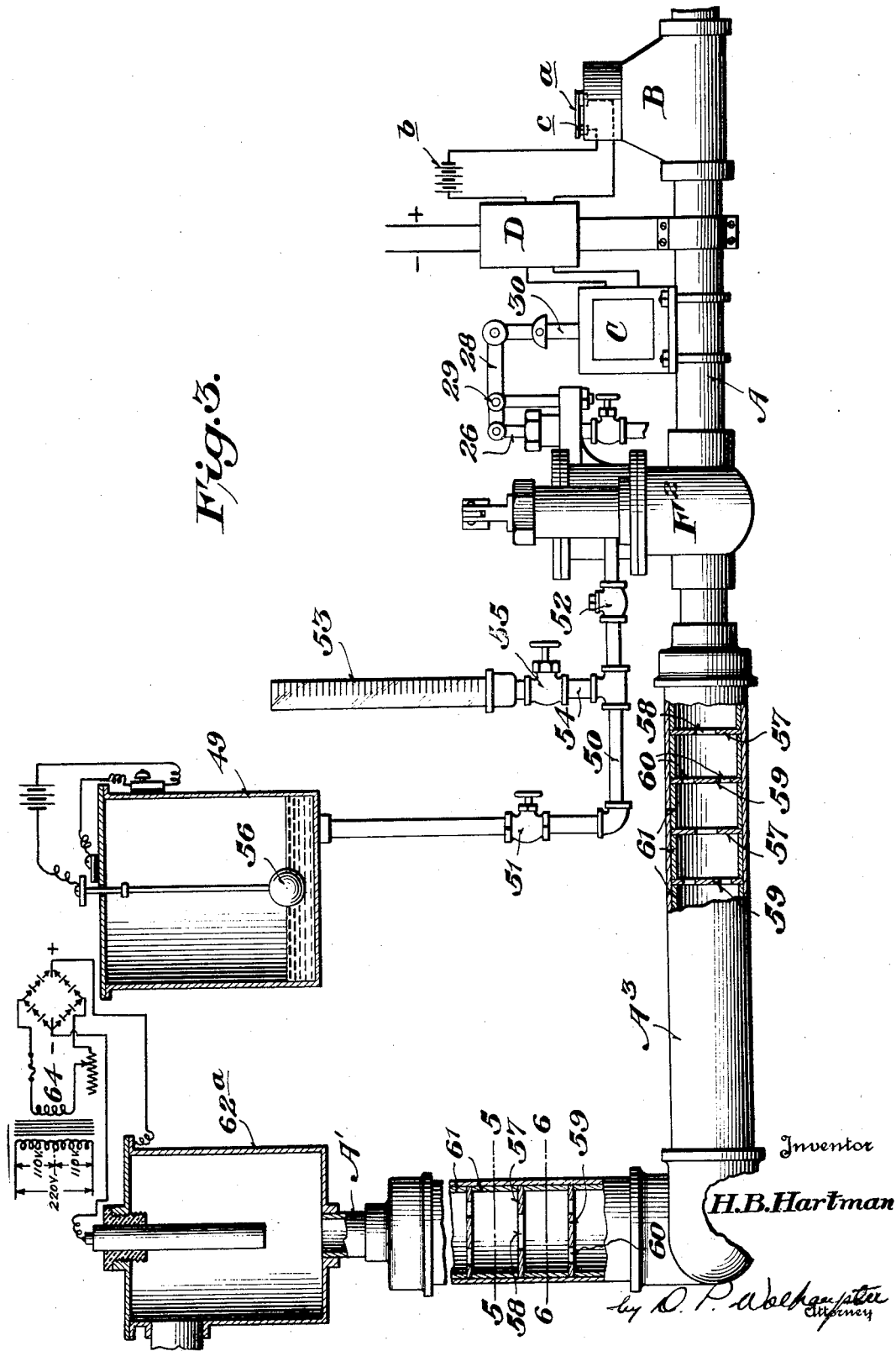
Inventor
H. B. Hartman

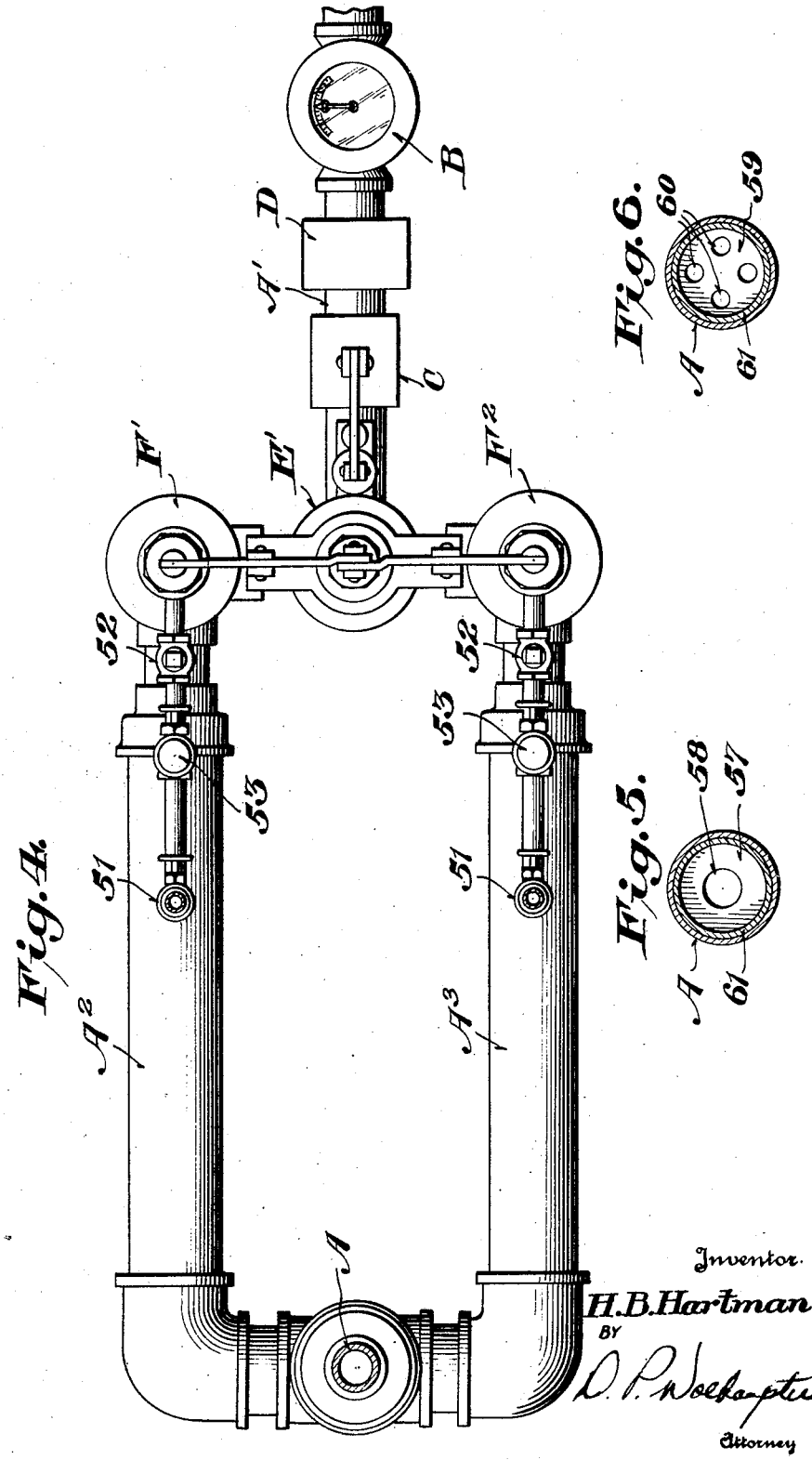

Patented Oct. 24, 1933

1,931,818

UNITED STATES PATENT OFFICE 1,931,818

WATER PURIFYING APPARATUS

Harry Buxton Hartman, Buffalo, N. Y.

Application October 10, 1930. Serial No. 487,872

14 Claims. (Cl. 210—17)

This invention relates to the art of water purification, and has particular reference to apparatus especially designed for introducing a chemical agent or agents into water to effect purification thereof.

The general object of the invention is to provide a comparatively simple, inexpensive, reliable and efficient apparatus for the purpose stated which is effective to cause a thorough and rapid mixing of the purifying agent or agents with the water, and which embodies a construction whereby the amount of the purifying agent or agents supplied to the water may be variably and accurately proportioned to the volume of water undergoing purification.

With the foregoing and other objects in view, which will become more fully apparent to those skilled in the art to which the invention appertains as the nature of the invention is better understood, the same consists in the novel features of construction and in the novel combination and arrangement of parts as will be hereinafter more fully described, illustrated in the accompanying drawings and defined in the appended claims.

In the drawings, wherein like characters of reference denote corresponding parts in different views:

Figure 1 is a longitudinal sectional view through the major portion of apparatus constructed in accordance with one practical embodiment of the invention.

Figure 1a is a view in elevation of that portion of the apparatus which is disposed beyond the right hand end of the apparatus illustrated in Figure 1.

Figure 2 is a cross section through the pressure motor.

Figure 3 is a side elevation, partly in section, of an alternative embodiment of the invention.

Figure 4 is a top plan view, partly in section, of the apparatus illustrated in Figure 3; and Figures 5 and 6 are detail cross sections on the lines 5—5 and 6—6, respectively of Figure 2.

Referring to the embodiment of the invention illustrated in Figures 1a and 2 of the drawings, A designates a water supply pipe in which is interposed a water meter designated generally as B.

At C is designated, generally, an electromagnet, while at D is indicated a relay through the instrumentality of which the electro-magnet C is placed under the control of a movable registering element of the meter A so as to be periodically energized by the flow of water through said meter.

Any suitable or desired means may be provided to cause periodic energization of the electro-magnet C by a movable registering element of the water meter B. For example, the usual rotary cubic foot per minute indicating hand $a$ of the meter may be connected through the relay D with one pole of a suitable source of current $b$, and a contact $c$, connected with the other pole of the source of current, may be provided to be engaged by the hand $a$ once during each revolution of said hand, thus to periodically close the operating circuit of the relay D and thereby cause the latter to periodically close the circuit through the electro-magnet C.

At E is designated, generally, a pressure motor interposed in the water pipe A at the delivery side of the meter B, and at F is designated generally, a pump which also is connected with the water pipe A and by means of which the purifying agent is introduced into the water flowing through said pipe.

The pressure motor E comprises a cylinder or casing 10 suitably connected at its inner end, as at all, with the water pipe A so as to communicate therewith, and suitably closed at its outer end as, for example, by means of a removable cap or cover 12.

Within the cylinder or casing 10 is a reciprocal piston 13 which is urged constantly toward the inner end of the cylinder by a coil spring 14 interposed between the piston and the cap or cover 12. A hollow, outwardly extending stem 15 is formed on said piston and has threaded therein or otherwise suitably connected therewith the inner end of a piston rod 16, which rod extends to the exterior of the casing 10 through an opening in the cap or cover 12 and is suitably packed as indicated generally at 17.

Formed through the piston 13 are ports 18, and controlling these ports is a valve in the form of a disk 19 which is movable between a seated or port closing position against the inner face of the piston, and an unseated or port opening position spaced inwardly from said piston, there being a coil spring 20 arranged in the hollow stem 15 of the piston and bearing against said valve and urging the latter constantly toward its open position. In addition, pins 21 are carried by the valve 19 and extend through the piston 13 to the outer side thereof for contact with the inner face of the cap or cover 12 to positively effect opening movement of said valve relative to the piston when the latter is moved a predetermined distance outward, the length of these pins being such that the valve is opened as the piston reaches approximately the end of its outward stroke.

Associated with the cylinder 10 is a valve casing 22 having a passage 23 formed therethrough which is in communication at one end with the outer end portion of said cylinder, and which has suitably connected with its other end a manually adjustable flow regulating valve 24. Arranged within the casing 22 is a valve 25 which is reciprocal between a closed or seated position, in which it denies or cuts off any flow through the passage 23, and an open or unseated position in which communication between the outer end of the cylinder 10 and the regulating valve 24 is established. This valve 25 is inclusive of a stem 26 which extends to the interior of the casing 22 through suitable packing means 27, and has pivotal connection at its outer end with an end of a rock lever 28 which is intermediately fulcrumed as at 29, the other end of said lever being suitably connected with the armature 30 of the electro-magnet C so that when said armature is energized and the armature 30 thereby is actuated, the valve 25 is opened. At 31 is designated a coil spring which serves to close said valve when the electro-magnet C is deenergized.

The pump F comprises a casing 32 interposed in the water pipe A so that water flowing through said pipe is adapted to enter said casing at one side thereof and to leave the same at the other side thereof. A removable cover 33 closes one end of the casing 32 and serves to retain within said casing a chamber element 34 which latter preferably is centrally located with respect to said casing so that water is required to pass therearound in its flow through said casing.

In the side wall of the chamber element 34 facing the direction of flow of water through the casing 32 and located preferably near the outer end of said chamber element, is an opening 35 through which water is adapted to enter said chamber element, while extending from the opposite side wall of said chamber element, from a point near the inner end of said chamber element and into the pipe A, is a tube 36 through which the purifying agent which is delivered into said chamber element is adapted to be introduced into the water flowing through the pipe A.

Carried by the removable cover 33 of the casing 32 is a pump cylinder 37 which is in communication at its inner end with the chamber element 34 through a port 38 formed in said cover 33, and which has reciprocally mounted therein a piston or plunger 39. This piston or plunger, or a suitable extension thereof, projects through suitable packing means 40 beyond the outer end of the cylinder 37 and at its outer end has pivotal connection with one end of a rock lever 41, which latter is intermediately pivoted as at 42 and at its other end has pivotal connection with the piston stem 16 of the pressure motor E. Thus outward and inward movements of the pressure motor piston 13 are effective to impart inward and outward movements, respectively, to the pump piston or plunger 39, as is manifest, and in this connection it is to be noted that the rock lever is slotted medially and at its ends and that the member 43 to which said lever is intermediately pivoted is mounted on a supporting bracket 44 for lateral adjustment to shift the pivot 42 longitudinally with respect to said lever, whereby the length of the stroke of the pump piston or plunger 39 may be varied.

Disposed within the chamber element 34 is a valve guide tube 45 in which is slidably mounted a valve 46 which is constantly urged by a coil spring 47 in a direction to seat against the cover 33 and to close the port 38, said valve carrying a pin 48 which extends through said port for cooperation with the inner end of the pump piston or plunger 39.

At 49 is designated a tank or reservoir to contain the water purifying agent to be introduced in measured quantities into the water flowing through the pipe A, said tank being connected with the pump cylinder 37 at a point spaced outward from the port 38 by a pipe 50 in which is interposed a manually operable cut-off valve 51 and a check valve 52, which latter preferably is located adjacent to the pump cylinder and opens in the direction of said cylinder. Also interposed in said pipe 50 is an indicating device by means of which the amount of the purifying agent introduced into the water pipe A at each stroke of the pump plunger 39 may be accurately predetermined, said device consisting in the present instance of a transparent, calibrated tube 53 connected with the pipe 50 by a pipe 54 in which latter is interposed a manually operable cut-off valve 55.

Figure 1 of the drawings illustrates the status of the parts of the apparatus at the completion of the inward stroke of the pump piston or plunger 39 and prior to the return of the pressure motor piston 13 to its inner position. Assuming, however, that the pressure motor piston 13 is at its innermost limit of movement within the cylinder 10 and that consequently the pump plunger 39 is at its limit of outward movement, having drawn a charge of the purifying liquid into the pump cylinder through the pipe 50, that the valve disk 19 is held sealed against the inner face of the piston 13 by the pressure of the water in the pipe A thereby denying flow of water through the ports 18 in said piston to the outer end of the cylinder 10, and that the valves 25 and 46 are closed, the operation of the apparatus is as follows:

When, by flow of water through the pipe A and the meter B, the indicating hand a of the latter moves into engagement with the contact c, the operating circuit of the relay D is closed and said relay operates to close the circuit through the electro-magnet C, upon energization of which the armature 30 thereof is moved inward with the consequent effect of opening the valve 25. In this connection it will be understood, of course, that the pressure motor cylinder is filled with water to both sides of the piston 13 and that, therefore, until the valve 25 is opened the piston is prevented from moving outward by the solid body of water at the outer side thereof. Upon opening of the valve 25, however, this body of water is released to flow from the cylinder 10 through the regulating valve 24, and immediately said body of water begins to escape, the pressure of the water in the pipe A acting against the valve disk 19 and the inner end of the piston 13, initiates outward movement of said piston, at the same time compressing the spring 14. As the water continues to escape from the outer end of the cylinder 10, the piston 13 with the valve disk 19 seated thereagainst, continues to move outward and to move the pump plunger 39 inward until finally the ends of the pins 21 contact with the cover 12 and prevent further outward movement of the valve disk. Since, however, continued outward movement of the piston 13 is unrestrained, said piston continues its outward movement under the influence of the water pressure after contact of the pins 21 with the cover 12, with the consequent result that the piston moves away from the valve disk and the ports or openings 18 in the piston are uncovered, thereby establishing communication through said ports between the inner and the outer ends of the cylinder. Thus, the water pressure against the inner and the outer faces of the piston become equalized substantially immediately and the spring 20 then acts to move the valve disk 19 farther open and to hold the same open while the relatively strong spring 14 acts to move the piston 10 inward. As the piston moves inward the valve disk 19 contacts with the inner end of the cylinder 10 and its inward movement is halted, but the piston continues to move inward until it engages the valve disk, whereupon the ports 18 are closed. If the valve 25 remains open the piston will again be moved outward by the pressure of the water and the operation just recounted will be repeated. That is to say, the piston 10 will continue to reciprocate as long as the valve 25 remains open. However, upon closing of the valve 25, the piston 10 will move to its innermost position as before, the water by-passing through the ports 13 to the outer end of the cylinder, but since the water then cannot escape from the outer end of the cylinder, the piston will be held against outward movement by the water trapped in the outer end of the cylinder and the motor will remain idle until the valve 25 again is opened, whereupon the piston will begin to reciprocate and continue reciprocating until the valve 25 again is closed. Thus, there will occur periodic reciprocations of the piston 13 which reciprocations are directly related to and controlled by the volume of water flowing through the pipe A, and in this connection it will be apparent that the ratio of the number of reciprocal movements of the piston with respect to the number of unit volumes of water flowing through the pipe A may be varied simply by varying the number of the contacts c. Assuming for example that the indicator hand a of the water meter makes one complete revolution for each cubic foot of water passing through the pipe A and the meter B, and that only a single contact c is provided, it is apparent that there will occur one complete cycle of operation of the pressure motor E for each cubic foot of water passing through the apparatus. On the other hand, by adding one or more contacts c, and by varying the length of said contacts the number of complete cycles of operation of the pressure motor for each cubic foot of water passing through the apparatus will be correspondingly increased.

Referring now to the operation of the pump F, it is apparent that inward movement of the plunger 39 forces the purifying liquid contained in the inner end of the pump cylinder against the valve 46 and thereby opens said valve with the result that the purifying liquid is forced through the port 38 into the chamber element 34, where it mixes with the water contained in said chamber element.

Due to the inlet opening 35 in one side of the chamber element 34, and to the outlet tube 36 leading from the other side of said chamber element, the latter not only is maintained constantly full of water, or constantly full of a mixture of water and the purifying agent, but there is a constant flow of water through said chamber element, so that the purifying agent is introduced slowly and steadily into the water flowing through the pipe A and therefore is thoroughly distributed through the water, which obviously would not be true in the absence of the chamber element 34 and if the successive charges of the chemical agent were shot from the pump directly into the pipe A. Moreover, in this connection, by reason of the chamber element 34 being located in the path of flow of water through the pipe A, with the consequent effect of causing the water to substantially divide into two streams, which pass to either side of the chamber element and come together after passing said chamber element, the thorough mixing of the purifying agent with the water is considerably enhanced.

With respect to the pin 48 of the valve 46, it will be observed that when the pump plunger 39 is at the end of its inward stroke, said pin is in engagement with the inner end of said pump plunger and therefore serves to prevent closing of the valve 46. Accordingly, a certain amount of outward movement of the pump plunger is necessary to permit the valve 46 to move to a closed position against the cover 33, the amount of such movement of the plunger depending, of course, upon the length of the pin 48. In this connection it will be observed that said pin is of such length, and that the pipe 50 communicates with the pump cylinder 37 at a point so spaced outward from the inner end of said cylinder, that the valve 46 is permitted to close only after an appreciable amount of outward movement of the pump piston and just prior to communication being established between the pipe 50 and the pump cylinder by outward movement of the pump plunger. Accordingly, during initial outward movement of the pump plunger following inward movement thereof to inject a charge of the purifying agent into the chamber element 34 a small quantity of water will be sucked from said chamber element through the port 38 into the inner end of the pump cylinder, with the result of washing or cleaning the port 38 and maintaining the same free from the formation of chemical crystals therearound, which is especially advantageous in the event of a strong chemical subject to ready crystallization being employed as the water purifying agent, as in such event, and in the absence of means to wash or clean the port 38, the same might soon become clogged and seriously interfere with proper operation of the apparatus.

Following closing of the valve 46, continued outward movement of the pump piston 39 uncovers the end of the pipe 50, or the port through which communication is established between said pipe and the pump cylinder, and results in a new charge of the purifying agent being sucked from said pipe 50 into the pipe cylinder, thereby completing the cycle of operation of the pump, which operation is repeated each time the pump piston again moves inward and subsequently outward.

Obviously, by adjusting the regulating valve 25, the rate of escape of water from the outer end of the cylinder 10 of the pressure motor E may be varied to vary the rate of movement of the pressure motor piston 13, thereby to vary the speed of operation of the pump plunger 39 and thus vary the rate of introduction of the purifying agent into the water flowing through the pipe A. On the other hand, irrespective of the adjustment of the regulating valve 25, the fulcrum point 42 of the rock lever 41 may be laterally shifted as heretofore stated to vary the effective length of the arms of said lever to either side of said fulcrum point, thereby to increase or decrease the length of the stroke of the pump plunger 39, with the effect of varying the amount of the purifying agent injected into the chamber element 34 at each stroke of the pump piston.

The calibrated tube 53, together with the valves 51 and 55, constitutes guide means for use in effecting adjustments of the fulcrum point 42 of the rock lever 41 so that the length of the stroke of the pump plunger 39 may be adjusted to accurately predetermine the amount of the purifying agent injected by the pump F into the chamber element 34 during each complete cycle of operation of said pump. For example, by opening the valve 55, the purifying agent from the tank or reservoir 49 may be permitted to flow into said tube to any desired height, whereupon the valve 51 is closed. By then observing by means of the calibrations on the tube 53 the amount of the purifying agent drawn into the pump during a complete cycle of operation of the pump, which amount will be indicated by a drop in the level of the purifying agent in the tube 53, the fulcrum point 42 of the lever 41 may be adjusted to vary the stroke of the pump plunger so that the exact amount of the purifying agent which it is desired shall be injected by the pump into the chamber 34 during a cycle of operation of the pump may be quickly and positively predetermined. By then closing the valve 55 and opening the valve 51 communication between the pump F and the reservoir 49 may be reestablished.

Preferably, but not necessarily, the tank 49 is provided with a float 56 (Fig. 3) and with an electric circuit inclusive of a bell or other indicating means and contacts adapted to be engaged by said float, to actuate said indicating means both when the tank is substantially full and when the purifying agent has been substantially emptied therefrom.

Although the provision of the chamber element 34 results in a more or less thorough distribution of the purifying agent with the water flowing through the pipe A, additional means may, if desired, be provided to assure a still more thorough intermixing of the purifying agent with the water. This means may consist, for example, of a set of disks 57 having central apertures 58, respectively, and a set of disks 59 having apertures 60 spaced around the center thereof, the said disks 57 and 59 being arranged in alternated spaced rotation either within the pipe A, or within a suitable chamber element constituting to all intents and purposes a part of the pipe A, and being held apart for instance by short sleeves 61 disposed therebetween, whereby the water is baffled in its flow and is caused to travel a more or less tortuous path, thereby producing a certain amount of agitation which results in the desired thorough mixing of the purifying agent with the water.

The present invention also is inclusive, preferably, of an electrolytic coagulator unit for use in instances where the water undergoing purification is inclusive of colloidal matter suspended therein, the purpose of said unit being to coagulate the ions of the colloidal matter as is necessary in order to permit the latter to settle. This unit comprises a tank or cylinder 62 interposed in the water pipe or conduit A and through which the water is required to flow, said tank comprising, for example, a cast iron shell provided with a stainless steel lining, and a preferably stainless steel electrode 63 suitably insulated from said shell and lining and extending into said tank, said lining and said electrode being connected, respectively, with the two poles of any suitable source of low voltage direct current, which may be supplied, for example, from an alternating current source by means of a rectifier designated generally as 64 (see Fig. 3). When the circuit through the tank 62 is closed, the low voltage current passing through the water causes the ions of the colloidal matter suspended in the water to take a single polarity, whereby ready settling of the colloidal mater is assured when the water reaches the usual filter beds after having passed through the tank 62.

In some instances it may be desirable to introduce two separate purifying agents or water softening chemicals or the like into the water undergoing treatment, and in that event, apparatus constructed as illustrated in Figures 3 and 4 of the drawings may be employed. That is to say, two pumps designated as $F'$, $F^2$, respectively, may be provided in lieu of the single pump F illustrated in Figure 1 of the drawings, the said pumps $F'$, $F^2$ being of the same construction and having the same mode of operation as the pump F and being actuated, preferably from a single pressure motor $E'$ which is a duplicate of the pressure motor E. In other words, the apparatus illustrated in Figures 3 and 4 of the drawings is the same as the apparatus illustrated in Figure 1 with the exception that two pumps with their related parts are provided in the second instance for joint operation to introduce two different agents into the water, to which end the water pipe, designated as $A'$, in Figures 3 and 4 of the drawings, is divided at a suitable point into two separate branches $A^2$ and $A^3$ in which the pumps $F'$ and $F^2$ are respectively interposed, the said branches each having disks 57, 59 arrayed therein as heretofore described, and at a suitable point beyond the pumps being joined with one another, so that a part of the water flowing through one branch is supplied with a given chemical by one pump and the remaining part of the water flowing through the other branch is supplied with a different chemical by the other pump. The respective chemicals are mixed with their respective portions of the water in the manner heretofore described in respect to the embodiment of the invention illustrated in Figure 1, and when the two columns of water finally joint one another at the junction of the pipe branches $A^2$ to $A^3$, there results a mixture of the water flowing from each of the pipe branches with the water flowing from the other pipe branch, which mixing preferably is rendered more thorough by interposing more disks 57, 59 in the pipe $A'$ beyond the branches $A^2$, $A^3$. An electrolytic coagulator unit $62^a$ similar to the unit heretofore described preferably as interposed in the pipe $A'$ beyond the branches $A^2$, $A^3$ thereof.

Without further description it is thought that the features and advantages of the invention will be readily apparent to those skilled in the art, and it will of course be understood that changes in the form, proportion of minor details of construction may be resorted to, without departing from the spirit of the invention and the scope of the appended claims.

I claim:

1. In combination, a water conduit, a motor connected with said conduit for operation by the water pressure in said conduit, a pump connected with said conduit for injecting a chemical agent into the same, a connection between said motor and said pump whereby the former actuates the latter, and a water meter interposed in said conduit and controlling the operation of said motor.

2. In combination, a water conduit, a water meter interposed in said conduit, a pump connected with said conduit for injecting a chemical agent into the same, a water motor for operating said pump, and means whereby a movable element of said meter controls operation of said motor.

3. In combination, a water conduit, and a pump device for injecting a chemical agent into said conduit, said pump device comprising a casing interposed in said conduit and closed at its ends, a chamber element disposed within said casing in spaced relation thereto and closed at its ends and into which the chemical agent is delivered, means for the flow of part of the water through said casing around said chamber element, and means for the flow of part of the water through said chamber element.

4. In combination, a water conduit, and a pump device for injecting a chemical agent into said conduit, said pump device comprising a casing interposed in said conduit, and a chamber element within said casing into which the chemical agent is delivered, said chamber element being disposed to cause the water to flow there-around and having a water inlet opening in one side thereof facing the direction of flow of the water and further having an outlet opening for the water and the chemical agent mixed therein, said outlet opening being disalined with respect to said inlet opening and being disposed in the side of said chamber element opposite to the side in which said inlet opening is provided.

5. In combination, a water conduit, and a pump device for injecting a chemical agent into said conduit, said pump device comprising a cylinder in communication through a port with said conduit, a piston reciprocal within said cylinder adapted upon its outward stroke to draw a charge of the chemical agent into said cylinder and upon its inward stroke force said charge through said port into the conduit, a valve controlling said port, and means whereby said valve is held open by said piston during the initial portion of the outward movement thereof to permit water to be drawn by the pump device from the conduit through said port to effect washing of the latter.

6. In combination, a water conduit, and a pump device for injecting a chemical agent into said conduit, said pump device comprising a cylinder in communication through a port with said conduit, a piston reciprocal within said cylinder adapted upon its outward stroke to draw a charge of the chemical agent into said cylinder and upon its inward stroke to force said charge through said port into the conduit, a valve movable in the direction of outward movement of said piston to close said port, a spring for so moving said valve, and a pin carried by said valve and extending through said port for cooperation with said piston whereby said valve is held open during the initial portion of the outward movement of said piston to permit a small amount of water to be drawn through said port from the conduit to effect washing of said port.

7. In combination, a water conduit, a pump device comprising a cylinder and a piston reciprocal therein for injecting a chemical agent into said conduit, a source of chemical agent supply connected by a pipe with said pump cylinder, means for adjusting the stroke of said piston, and measuring means for use in effecting stroke adjustment of said piston to accurately predetermine the amount of the chemical agent delivered by the pump to the conduit at each stroke of the pump, said measuring means comprising a calibrated tube connected with said pipe, a valve in said pipe between said source of supply and said tube, and a second valve in said pipe between said tube and said pump cylinder.

8. In combination, a water conduit, a pump connected with said conduit for injecting a chemical agent into the same, and a water pressure motor for operating said pump, said motor comprising a cylinder connected at one end with said conduit, a piston reciprocal within said cylinder and having a water passage formed therethrough, a spring constantly urging said piston inward toward said conduit, a valve arranged to seat against the inner side of said piston to close the water passage therein, means whereby said valve is positively opened when said piston reaches a predetermined point in its outward movement, and valve controlled water escape means connected with the outer end of said cylinder.

9. In combination, a water conduit, a pump connected with said conduit for injecting a chemical agent into the same, and a water pressure motor for operating said pump, said motor comprising a cylinder connected at its inner end with said conduit and provided at its outer end with a water escape passage, a piston reciprocal within said cylinder and having an opening formed therethrough, a disk valve movable away from and against the inner face of said piston to control the flow of water through said opening, a spring constantly tending to move said piston inward, a pin carried by said valve and extending through said piston for engagement with the outer end of said cylinder to effect opening of said valve when said piston reaches a predetermined point in its outward movement, a valve normally closing said water escape passage, a water meter interposed in said conduit, and means whereby a movable element of said water meter effects opening of said last named valve.

10. In combination, a water conduit, a pump connected with said conduit for injecting a chemical agent into the same, and a water pressure motor for operating said pump, said motor comprising a cylinder connected at its inner end with said conduit and provided at its outer end with a water escape passage, a piston reciprocal within said cylinder and having an opening formed therethrough, a disk valve movable away from and against the inner face of said piston to control the flow of water through said opening, a spring constantly tending to move said piston inward, a pin carried by said valve and extending through said piston for engagement with the outer end of said cylinder to effect opening of said valve when said piston reaches a predetermined point in its outward movement, a valve normally closing said water escape passage, a water meter interposed in said conduit, and a movable adjustable regulating valve for controlling the flow of water through said water escape passage when said last named valve is opened.

11. In combination, a water conduit, a water meter interposed in said conduit, a pump connected with said conduit for injecting a chemical into the same, a water motor connected with said conduit for operation by the water pressure in the conduit and also connected with said pump for operating the latter, an electromagnet, means whereby a movable element of the meter controls periodic energization and deenergization of said magnet, and means whereby energization and deenergization of said magnet controls operation of said motor.

12. In combination, a water conduit, a water meter interposed in said conduit, a pump connected with said conduit for injecting a chemical agent into the same, a water motor connected with said pump for operating the same, and electro-magnetic means under the control of said meter and controlling the operation of said pump.

13. In combination, a water conduit, a chamber element disposed within said conduit and closed at one end, means at the other end of said chamber element for the supply of a chemical agent into the same, said chamber element being disposed for the flow of part of the water around the outside thereof and having disalined openings in opposite sides thereof for the flow of part of the water through the same.

14. In combination, a water conduit, a pump connected with said conduit for injecting a chemical agent into the same, a pump operating motor comprising a cylinder connected with the conduit and a piston reciprocal within the cylinder and connected with the pump, means whereby a substantially balanced pressure of the water normally is maintained on both sides of the piston to render the motor normally inactive, means whereby a release of pressure on one side of the piston initiates operation of said motor, a water meter connected with the conduit, and means whereby operation of said meter periodically effects a release of pressure on one side of said piston.

HARRY BUXTON HARTMAN.